US008294590B2

(12) United States Patent
Selwood

(10) Patent No.: US 8,294,590 B2
(45) Date of Patent: Oct. 23, 2012

(54) MECHANISM FOR DETECTING SEPARATION OF A COMPONENT FROM A PART AND A COMPONENT CARRYING SUCH A MECHANISM

(75) Inventor: Andrew George Selwood, Reading (GB)

(73) Assignee: Keymat Technology Limited, West Drayton (GB)

(*) Notice: Subject to any disclaimer, the term of this patent is extended or adjusted under 35 U.S.C. 154(b) by 436 days.

(21) Appl. No.: 12/726,813

(22) Filed: Mar. 18, 2010

(65) Prior Publication Data

US 2010/0238040 A1 Sep. 23, 2010

(51) Int. Cl.

| | |
|---|---|
| ***G08B 21/00*** | (2006.01) |
| ***G06F 1/16*** | (2006.01) |
| ***G06Q 40/00*** | (2006.01) |
| *E05G 1/024* | (2006.01) |

(52) U.S. Cl. ............... 340/686.1; 340/686.4; 340/568.1; 340/568.8; 341/22; 109/2; 109/58; 235/379; 361/679.08; 200/61.81; 713/194

(58) Field of Classification Search ............... 340/686.1, 340/686.4, 568.1, 568.8

See application file for complete search history.

(56) References Cited

U.S. PATENT DOCUMENTS

| | | | | |
|---|---|---|---|---|
| 2,605,375 | A | 7/1952 | Ellithorpe | |
| 7,270,275 | B1 * | 9/2007 | Moreland et al. | 235/492 |
| 7,832,628 | B2 * | 11/2010 | Mittler | 235/379 |
| 2003/0047433 | A1 | 3/2003 | Moree | |
| 2005/0275538 | A1 | 12/2005 | Kulpa | |
| 2008/0230355 | A1 | 9/2008 | Leon | |
| 2008/0278217 | A1 * | 11/2008 | Hankhofer et al. | 327/509 |

FOREIGN PATENT DOCUMENTS

| | | |
|---|---|---|
| EP | 1826702 | 8/2007 |
| GB | 2444968 | 6/2008 |
| WO | 2006133540 | 12/2006 |

* cited by examiner

*Primary Examiner* — Donnie Crosland

(57) ABSTRACT

A component (10) of a device, such as a keypad mechanism (10) of a cash dispenser, is provided with a mechanism for detecting separation of the component from another part (16) of the device, for example a front panel (16) of the cash dispenser. The mechanism includes a member (64) moveable between first and second positions, and biasing means (34) to bias the member resiliently in the first position. In use, the member (64) is forced into the second position by contact with the part (16). If the component (10) and the part (16) are separated, the member (64) moves from the second position to the first position. The mechanism also includes a signal means to provide a warning signal when the member (64) moves to the first position. A tube (50) of ceramic material or other hard material is provided to resist ingress of a drill bit to the member (64).

29 Claims, 1 Drawing Sheet

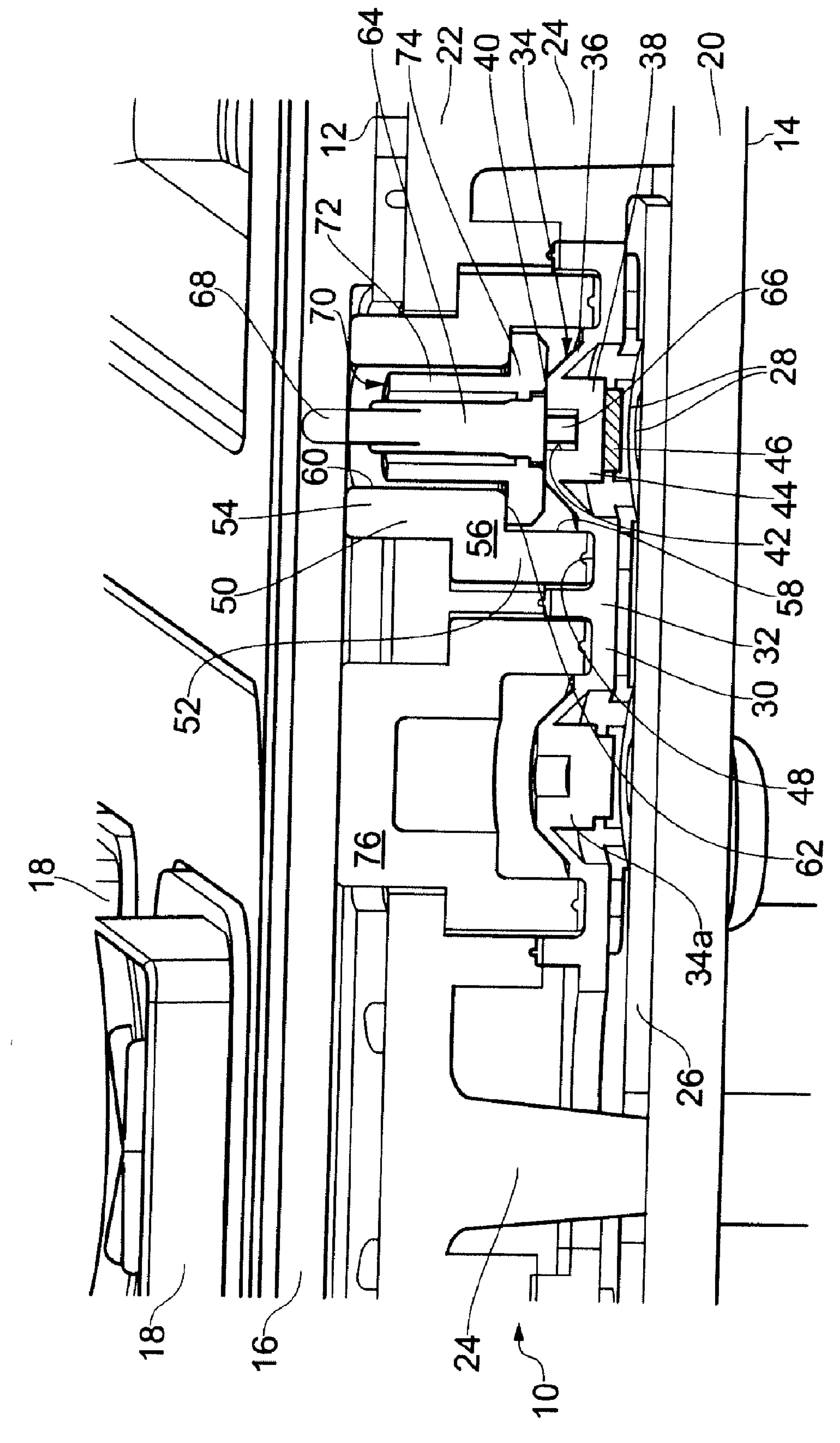
64
74
22
40
34
24
36
38
20
12
14
72
68
70
66
28
60
46
54
44
56
50
42
58
32
52
30
48
62
76
18
34a
26
24
18
16
10

MECHANISM FOR DETECTING SEPARATION OF A COMPONENT FROM A PART AND A COMPONENT CARRYING SUCH A MECHANISM

TECHNICAL FIELD

The current invention relates to a mechanism for detecting separation of a component from a part, and also to a component carrying such a mechanism.

BACKGROUND

There are many different types of devices where it is desirable to be able to detect separation of a component of the device from another part of the device.

One such type of device is a terminal for conducting financial transactions such as a hole-in-the-wall cash dispenser.

A hole-in-the-wall cash dispenser generally includes a keypad mechanism, a card reader and a display. These components are mounted against a cover which forms the front panel of the dispenser. In order to reduce the possibility of theft of electronic data from the dispenser, it is desirable to be able to detect separation of each of the keypad mechanism, the card reader and the display unit from the front panel. If separation of any of these components from the front panel is detected this can be used to trigger deletion of data before the data can be accessed by thieves.

A mechanism suitable for detecting separation of one of these components from the front panel comprises a member moveable between first and second positions, means for resiliently biasing the member into the first position, and signal means for providing a signal when the member moves from the second position to the first position. The mechanism might be incorporated into the component with the member projecting from the component when the member is in the first position. As the component is assembled against the front panel, the member contacts the front panel and is forced against the resilient bias into the second position. If the component and the front panel are subsequently separated, the biasing means moves the member back from the second position to the first position, causing the signal means to provide a signal. The signal can be used to trigger deletion of data.

However, a skilled thief may be able to drill into the component so that the drill bit penetrates the moveable member and holds the moveable member in the second position. If the thief then separates the component from the front panel, the moveable member will not be able to move to the first position and no signal will be generated.

Overview

In accordance with a first aspect of the invention, there is provided a mechanism for detecting separation of a component from a part, the mechanism comprising: a member moveable between a first position and a second position; means for resiliently biasing the member into the first position, the member being forceable against said resilient bias provided by the biasing means into the second position; signal means for providing a signal when the member moves from the second position to the first position; and a tube surrounding the member to resist ingress of a drill bit to the member.

In accordance with a second aspect of the invention, there is provided a component that in use lies adjacent a part, the component including: a member moveable between first and second positions; means for resiliently biasing the member into the first position, the member being forceable against said resilient bias provided by the biasing means into the second position by contact between the member and the part so that the biasing means moves the member from the second position to the first position when the component and the part are separated; signal means for providing a signal when the member moves from the second position to the first position; and a tube surrounding the member to resist ingress of a drill bit to the member.

Preferred embodiments of the first and second aspects of the invention are defined in the dependent claims.

BRIEF DESCRIPTION OF THE DRAWINGS

FIG. 1 illustrates an embodiment.

DETAILED DESCRIPTION

The following is a more detailed description of embodiments of the invention, by way of example, reference being made to the appended drawing which is a schematic cut-away representation showing part of a keypad mechanism mounted against a front panel.

In the current example, the keypad mechanism 10 and the front panel 16 are part of a terminal for conducting financial transactions, for example a hole-in-the-wall cash dispenser.

The keypad mechanism 10 has opposite front and rear sides 12, 14. The front and rear sides 12, 14 are connected by at least one edge (not shown in the Figure). For example, an edge connecting the front and rear sides 12, 14, may extend perpendicularly to the front and rear sides 12, 14 and in a plane parallel to the cross-sectional plane shown in the Figure.

The front panel 16 overlies the keypad mechanism 10 and lies closely adjacent and parallel to the front side 12.

The terminal is provided with the plurality of buttons—two of which are shown at 18 in the Figure. These buttons 18 are used for entry of security information. The keypad mechanism 10 operates to convert keystrokes enacted on the buttons 18 into electrical signals, so that the security information entered via the buttons 18 can be passed to an electronic unit (not shown in the Figure) in the form of the electrical signals, for processing. The keypad mechanism 10 may convert keystrokes into electrical signals in any known manner. The buttons 18 of the terminal may be part of the keypad mechanism 10, in which case they may protrude through holes in the front panel 16. Alternatively, the buttons 18 need not be part of the keypad mechanism 10 and they may be carried by the front panel 16 or by some other component. In this case, the buttons may physically interact with the keypad mechanism 10 when they are pressed. The buttons 18 shown in the Figure are spring loaded push buttons, although any type of button may be used. For example, the buttons may be touch sensitive buttons.

The keypad mechanism 10 has a rear wall 20 at the rear side 14 and a front wall 22 at the front side 12. A plurality of spacers 24 extend from the front wall 22 and serve both the space and connect the rear and front walls 20,22.

A printed circuit board 26 is mounted on the rear wall 20 with the connections and conductive tracks of the printed circuit board 26 facing towards the front wall 22. The printed circuit board 26 preferably carries circuits that are involved in the conversion of keystrokes into electrical signals. In addition, as discussed below, the printed circuit board 26 also plays a roll in the provision of a signal indicating that the keypad mechanism 10 has been separated from the front panel 16.

A moulded silicone rubber mat 30 lies above and immediately adjacent the printed circuit board 26. The silicone rubber mat 30 has a planar portion 32 and a formation 34 which, as will be described in more detail below, serves to provide a resilient biasing force. The formation 34 has a frustro-conical wall 36 and a cup 38. The frustro-conical wall 36 extends upwardly from the planar portion 32 with the wider end of the frustro-conical wall 36 being located at and adjoining the planar portion 32. The narrower end of the frustro-conical wall 36 is connected to a rim 40 of the cup 38. As seen in the Figure, the cup 38 depends from the frustro-conical wall 36 into the conical space within the frustro-conical wall 36. An opening 42 in the cup 38 faces upwardly towards the front side 12 of the keypad mechanism 10 and a base 44 of the cup 38 faces downwardly towards the printed circuit board 26.

A conductive carbon disc 46 is adhered to the lower surface of the base 44 of the cup 38 so that the carbon disc 46 lies adjacent a plurality of connections 28 provided on the printed circuit board 26.

The planar portion 32 of the silicone rubber mat 30 is provided with an annular groove 48 which extends around the formation 34.

The keypad mechanism 10 also comprises a tube 50 formed from a hard ceramic material. An example of a suitable ceramic material is Technox Zirconia 2000 (Trademark). The tube 50 has a wider cylindrical portion 52 and a narrower cylindrical portion 54 connected by a connecting portion 56. The bore of the tube 50 has a wider bore portion 58 which lies within the wider cylindrical portion 52 and a narrower portion 60 which lies within the narrower cylindrical portion 54. The wider bore portion 58 is separated from the narrower bore portion 60 by a shoulder 62 that is provided by the connecting portion 56.

The ceramic tube 50 stands upwardly from the silicone rubber mat 30 with the wider cylindrical portion 52 received within the annular groove 48 in the silicone rubber mat 30. The narrower cylindrical portion 54 extends through the front wall 22 and, when the keypad mechanism 10 is assembled with the front panel 16, as shown in the Figure, then the narrower cylindrical portion 54 contacts the front panel 16.

The formation 34 in the silicon rubber mat 30 lies within the wider bore portion 58 of the tube 50 and so is protected by the tube 50.

A spring-loaded telescopic pin 64 extends through the bore of the ceramic tube 50. The telescopic nature of the pin 64 allows the pin 64 to be compressed by a short distance in the direction of its longitudinal axis. The spring-loading urges the pin 64 into a fully extended position. The telescopic pin 64 has a lower end 66 which is received in the opening 42 of the cup 38 of the formation 34. The telescopic pin 64 also has an upper end 68 which lies generally at the front side 12 of the keypad mechanism 10.

The telescopic pin 64 is located within the bore of the ceramic tube 50 using a locator sleeve 70. The locator sleeve 70 has a cylindrical portion 72 and a rim 74. The cylindrical portion 72 lies relatively closely within the narrower bore portion 60 of the tube 50. The rim 74 abutts the shoulder 62 of the tube 50. The locator sleeve 70 serves to locate the telescopic pin 64 so that the pin 64 is coaxial with the ceramic tube 50. The locator sleeve 70 allows the telescopic pin 64 to move backwards and forwards along the axis of the pin 64.

The operation of the keypad mechanism 10 is as follows.

The formation 34 of the silicone rubber mat 30 serves to urge the telescopic pin 64 towards the front side 12 of the keypad mechanism 10. In the Figure, the keypad mechanism 10 is shown assembled with the front panel 16. However, purely for the sake of illustration, the formation 34 and the telescopic pin 64 are shown in the Figure in the positions they would assume in the absence of the front panel 16. Hence, when the front panel 16 is absent, the formation 34 stands upwardly from the silicone rubber mat 30 as shown and the upper end 68 of the telescopic pin 64 projects outwardly from the front side 12 of the keypad mechanism 10 as shown. The carbon disc 46 is spaced from and does not contact the connections 28 that are provided under the carbon disc 46 on the printed circuit board 26.

In order to assemble the keypad mechanism 10 with the front panel 16, the front panel 16 is brought into contact with the front side 12 of the keypad mechanism 10. During this process, the front panel 16 contacts the upper end 68 of the telescopic pin 64 causing the telescopic pin 64 to move downwardly towards the rear wall 20. This movement is resisted by the resilient bias provided by the formation 34 (biasing the telescopic pin 64 upwardly). As the telescopic pin 64 is depressed into the keypad mechanism 10 by contact with the front panel 16, the frustro-conical wall 36 deforms so that the cup 38 moves towards the printed circuit board 26. This movement brings the conductive carbon disc 46 into contact with the connections 28 on the printed circuit board 26. In this way, a circuit is closed.

As the telescopic pin 64 is depressed by the front panel 16, the telescopic pin 64 undergoes a small amount of contraction in the direction of its axis. This ensures that the carbon disc 46 remains in contact with the connections 28 despite small variations in the position of the front panel 16 and despite small movements of the front panel 16 relative to the keypad mechanism 10.

A user then operates the terminal depressing the buttons 18 to enter security information. The keypad mechanism 10 operates, in a known manner, to convert these keystrokes into electrical signals that are passed to an electronic unit which may be located, for example, below the rear wall 20 of the keypad mechanism 10.

In order to access the electronic unit, a thief will generally have to remove the keypad mechanism 10 from the front panel 16. This separation allows the formation 34 to push the telescopic pin 64 upwardly so that the upper end 68 of the telescopic pin 64 once again projects from the front side 12 of the keypad mechanism 10. During this process, the carbon disc 46 lifts away from the connections 28 of the printed circuit board 26 so as to open the circuit. The opening of the circuit sends a signal to the electronic unit which causes the electronic unit to delete all information stored in the electronic unit.

In the absence of the ceramic tube 50, it is possible that a skilled thief may be able to lock the telescopic pin 64 in the depressed position, so as to maintain the carbon disc 46 in contact with the connections 28, before separating the keypad mechanism 10 from the front panel 16. For example, in the absence of the ceramic tube 50, it may be possible to drill into the keypad mechanism 10 through an edge connecting the front and rear sides 12,14, so that the drill bit penetrates the telescopic pin 64 locking the pin 64 in the depressed position.

However, this possibility is prevented by the ceramic tube 50. As the material of the ceramic tube 50 is harder than conventional drill bits, the drill is unable to penetrate the ceramic tube 50. In addition, the cylindrical outer surface of the tube 50 will tend to deflect a drill bit away from and to the side of the ceramic tube 50.

Hence, when the keypad mechanism 10 is separated from the front panel 16, the telescopic pin 64 moves upwardly so as to trigger deletion of information held on the electronic unit, as discussed above.

As seen in the Figure, the keypad mechanism 10 also comprises a second formation 34*a* formed on the silicon rubber mat 30. Overlying the second formation 34*a*, there is provided a plastic cup 76 which is similar in shape and appearance to the ceramic tube 50 but which has a closed end on the front side 12 of the keypad mechanism 10. When visually inspected from an edge of the keypad mechanism 10, the plastic cup 76 appears identical to the ceramic tube 50. The purpose of the plastic cup 76 is to act as a decoy, so that a thief will not know whether the telescopic pin 64 is located within the ceramic tube 50 or within the plastic cup 76. If the second formation 34*a* is forced down onto the printed circuit board 26, this causes a tamper signal.

It will be appreciated that many potential modifications may be made to the keypad mechanism 10.

The ceramic tube 50 need not have the configuration shown in the Figure and described above. Any tubular configuration suitable for surrounding the telescopic pin 64 may be used. Although the tube preferably has a curved exterior surface, so as to deflect a drill bit, the tube may have one or more surfaces of other configuration, such as planar. In this case, even if the tube may not deflect a drill bit, the hardness of the ceramic material will prevent penetration by the drill bit.

A tube provided in order to protect the telescopic pin 64 from drill bit attack, need not be made from a ceramic material. Any material that is suitably hard so as to resist drill bit attack may be used. Preferably, the material will have a hardness of at least 85 Rockwell C.

In the embodiment described above, the formation 34 formed on the silicone rubber mat 30 acts to resiliently bias the pin 64 upwardly towards the front side 12 of the keypad mechanism 10. Any suitable biasing means may be used. For example, a spring may be used.

The telescopic pin 64 may have any suitable configuration. Indeed, it is not necessary to use a pin shape. Any moveable member moving between first and second positions may be used.

The keypad mechanism 10 need not use the printed circuit board 26. It could use a flexible printed circuit instead. In this case it may be possible to omit the carbon disc 46.

In the example discussed above, the mechanism of the invention is used to detect separation of the keypad mechanism 10 from the front panel 16. However, this need not be the case, the mechanism can be used to detect separation of any component of a device from any other part of the device. For example, the mechanism could be used to detect separation of a card reader or a display unit from the front panel of a cash dispenser or other type of terminal. Alternatively, the mechanism can be used to detect separation of a component from a cover other than a front panel, such as a side or rear cover, or from a part that is not a cover at all. One possible application is in a safe, wherein the mechanism could be used to detect release or removal of a component or the opening of a panel.

The mechanism is preferably carried by the component, but may be separate from the component.

The invention claimed is:

1. A component that in use lies adjacent a part, the component including:

a member moveable between first and second positions;

means for resiliently biasing the member into the first position, the member being forceable against said resilient bias provided by the biasing means into the second position by contact between the member and the part so that the biasing means moves the member from the second position to the first position when the component and the part are separated;

signal means for providing a signal when the member moves from the second position to the first position; and a tube surrounding the member to resist ingress of a drill bit to the member.

2. The component of claim 1, wherein the member is elongate having an axis and the member moves along the axis between the first and second positions.

3. The component of claim 2, wherein the axis is parallel to or coaxial with the bore of the tube.

4. The component of claim 1, wherein the tube has a curved outer surface for deflecting a drill bit away from the tube.

5. The component of claim 4, wherein the curved outer surface is right circular cylindrical.

6. The component of claim 1, wherein the tube is made of a ceramic material.

7. The component of claim 1, wherein the tube is made of a material that has a hardness of at least 85 Rockwell C.

8. The component of claim 1, wherein the tube has first and second opposite ends and the member has first and second opposite ends, the first member end projecting from the first tube end when the member is in the first position and the second member end interacting with the signal means to provide said signal.

9. The component of claim 8, wherein said forcing of the member into the second position results from contact between the first member end and the part.

10. The component of claim 8, wherein the interaction between the second member end and the signal means opens an electrical switch when the member is in one of the first and second positions and closes the electrical switch when the member is in the other one of the first and second positions.

11. The component of claim 8, wherein the tube has a first cylindrical portion with a first smaller internal diameter at the first tube end and a second cylindrical portion with a second larger internal diameter at the second tube end.

12. The component of claim 8, wherein the biasing means and/or the signal means is/are at least partially received in the tube at the second tube end.

13. The component of claim 1, wherein the member projects from the component when the member is in the first position.

14. The component of claim 1, in combination with the part.

15. The component of claim 1, wherein the component is a keypad mechanism, a keyboard mechanism, a card reader or a display unit.

16. The component of claim 14, wherein the part comprises a cover.

17. A keypad or keyboard, comprising a component according to claim 1, wherein the component is a keypad mechanism or a keyboard mechanism, and also comprising the part, wherein the part is a cover.

18. A mechanism for detecting separation of a component from a part, the mechanism comprising:

a member moveable between a first position and a second position;

means for resiliently biasing the member into the first position, the member being forceable against said resilient bias provided by the biasing means into the second position;

signal means for providing a signal when the member moves from the second position to the first position; and a tube surrounding the member to resist ingress of a drill bit to the member.

19. The mechanism of claim 18, wherein the member is elongate having an axis and the member moves along the axis between the first and second positions.

20. The mechanism of claim 19, wherein the axis is parallel to or coaxial with the bore of the tube.

21. The mechanism of claim 18, wherein the tube has a curved outer surface for deflecting a drill bit away from the tube.

22. The mechanism of claim 21, wherein the curved outer surface is right circular cylindrical.

23. The mechanism of claim 18, wherein the tube is made of a ceramic material.

24. The mechanism of claim 18, wherein the tube is made of a material that has a hardness of at least 85 Rockwell C.

25. The mechanism of claim 18, wherein the tube has first and second opposite ends and the member has first and second opposite ends, the first member end projecting from the first tube end when the member is in the first position and the second member end interacting with the signal means to provide said signal.

26. The mechanism of claim 25, wherein said forcing of the member into the second position results from contact between the first member end and the part.

27. The mechanism of claim 25, wherein the interaction between the second member end and the signal means opens an electrical switch when the member is in one of the first and second positions and closes the electrical switch when the member is in the other one of the first and second positions.

28. The mechanism of claim 25, wherein the tube has a first cylindrical portion with a first smaller internal diameter at the first tube end and a second cylindrical portion with a second larger internal diameter at the second tube end.

29. The mechanism of claim 25, wherein the biasing means and/or the signal means is/are at least partially received in the tube at the second tube end.

* * * * *